(12) United States Patent
Villafana et al.

(10) Patent No.: US 12,025,222 B1
(45) Date of Patent: Jul. 2, 2024

(54) EXTERNAL PARKING LOCK FOR ELECTRIC DRIVE SYSTEMS

(71) Applicant: GreenPower Motor Company, Rancho Cucamonga, CA (US)

(72) Inventors: Osvaldo Villafana, Porterville, CA (US); Ryan Haroutunian, Rancho Cucamonga, CA (US)

(*) Notice: Subject to any disclaimer, the term of this patent is extended or adjusted under 35 U.S.C. 154(b) by 82 days.

(21) Appl. No.: 17/871,104

(22) Filed: Jul. 22, 2022

(51) Int. Cl.
| | | |
|---|---|---|
| *F16H 63/34* | (2006.01) | |
| *B60T 1/00* | (2006.01) | |
| *F16D 63/00* | (2006.01) | |

(52) U.S. Cl.
CPC .......... *F16H 63/3466* (2013.01); *B60T 1/005* (2013.01); *F16D 63/006* (2013.01); *F16H 63/3425* (2013.01); *B60Y 2300/18141* (2013.01)

(58) Field of Classification Search
CPC .. F16H 63/34; F16H 63/3425; F16H 63/3466; B60Y 2200/90; B60Y 2200/91; B60Y 2300/18141; B60T 1/005; B60T 1/06; B60T 1/062; B60T 1/065; B60K 1/00; B60K 2001/001; F16D 63/006
USPC ...................................................... 192/219.5
See application file for complete search history.

(56) References Cited

U.S. PATENT DOCUMENTS

| | | |
|---|---|---|
| 7,828,124 B2 | 11/2010 | Sano et al. |
| 8,387,759 B2 | 3/2013 | Prix |
| 9,995,390 B2 | 6/2018 | Al-Regib et al. |
| 10,391,998 B2 | 8/2019 | Okubo et al. |
| 10,630,140 B2 | 4/2020 | Pritchard et al. |
| 10,829,109 B2 | 11/2020 | Manivasagam et al. |
| 10,843,672 B2 | 11/2020 | Kucab |
| 2002/0116101 A1 | 8/2002 | Hashiba et al. |
| 2010/0320018 A1 | 12/2010 | Gwozdek et al. |
| 2010/0320964 A1 | 12/2010 | Lathrop et al. |
| 2012/0018259 A1 | 1/2012 | Prix |
| 2012/0138419 A1 | 6/2012 | Kim et al. |
| 2012/0285755 A1 | 11/2012 | Keller |
| 2013/0197731 A1 | 8/2013 | Schum et al. |
| 2018/0118190 A1 | 5/2018 | Ruybal et al. |
| 2018/0180150 A1* | 6/2018 | Hiyoshi .............. F16H 63/3416 |
| 2019/0154149 A1* | 5/2019 | Gruber ..................... B60K 1/00 |
| 2020/0332894 A1 | 10/2020 | Gebert et al. |
| 2023/0050189 A1* | 2/2023 | Deppert ................... B60K 1/00 |
| 2023/0074092 A1* | 3/2023 | Vasanadu ................ F16H 59/68 |

* cited by examiner

*Primary Examiner* — Richard M Lorence
(74) *Attorney, Agent, or Firm* — Goldstein Law Offices, P.C.

(57) ABSTRACT

A parking lock assembly for a vehicle with an electric drive system, the parking lock assembly comprises a parking gear, an actuator housing containing an actuator and locking lever, and a mounting bracket. The electric drive system has a drive motor, a drive shaft, and a plurality of wheels. The parking gear is fastened between the drive shaft and the drive motor to form a linkage, and the actuator housing is held in a position in close proximity to the parking gear, allowing the locking gear to engage the parking gear to arrest the rotation of the drive shaft and prevent the vehicle from moving. A return spring allows the locking lever to disengage from the parking gear. The mounting bracket allows the actuator housing to be externally mounted to a mounting point located on the vehicle or to a housing surface external to the drive motor.

16 Claims, 6 Drawing Sheets

EXTERNAL PARKING LOCK FOR ELECTRIC DRIVE SYSTEMS

TECHNICAL FIELD

The present disclosure relates generally to a locking mechanism for an electric drive system. More particularly, the present disclosure relates to an external parking lock for arresting an electric direct drive shaft.

BACKGROUND

Many electric vehicles employ a direct drive system in which an electric drive motor is directly connected to a drive shaft. The drive motor turns the drive shaft, which in turn powers a plurality of wheels via a differential. Transmission-equipped motor vehicles typically have a parking pawl configured within the transmission of the vehicle which locks the transmission when the vehicle is placed in the parked position. However, electric vehicles with direct drive systems do not have transmissions, and typically rely on parking brakes which frictionally lock the wheels of the vehicle to prevent unwanted motion when the vehicle is parked.

Parking mechanisms specific to electric vehicles may be found within the prior art. However, such mechanisms are directly integrated into the drive motor housing, and are designed to prevent the drive motor from turning the drive shaft when engaged. These mechanisms cannot be incorporated into existing electric vehicles with conventional direct drive systems.

Therefore, a need exists for a robust, externally mounted parking lock for direct drive electric vehicles which is directly accessible for ease of maintenance, and which can be retrofitted onto existing direct drive electric vehicles.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a parking lock which prevents unwanted movement by a vehicle with an electric drive system comprising a drive motor with a drive motor shaft, a drive shaft, and a plurality of wheels. Accordingly, the present disclosure provides a parking lock assembly comprising a parking gear which is fastened to and which forms a linkage between the drive motor shaft and the drive shaft, and an actuator housing containing an actuator and a locking lever. The actuator housing is positioned in close proximity to the parking gear. When the actuator is activated, the actuator pivotally displaces the locking lever, causing the locking lever to engage with the parking gear and arrest the rotation thereof. The linkage between the parking gear and the drive shaft further prevents the drive shaft from rotating, thereby preventing the wheels of the vehicle from turning.

It is another aspect of an example embodiment in the present disclosure to provide a parking lock which is external to the electric drive system. Accordingly, the present disclosure provides a mounting bracket which is attached to a mounting point on the undercarriage of the vehicle or to the housing of the drive motor. The actuator housing is secured to the mounting bracket. The mounting bracket holds the actuator housing in a position which allows the locking lever to optimally engage the parking gear.

It is yet another aspect of an example embodiment in the present disclosure to provide a parking lock containing a means for disengaging the parking lock from the parking gear. Accordingly, the actuator housing further contains a return spring which exerts return force against the locking lever, thus allowing the locking lever to pivot away from and disengage with the parking gear when the actuator is deactivated.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
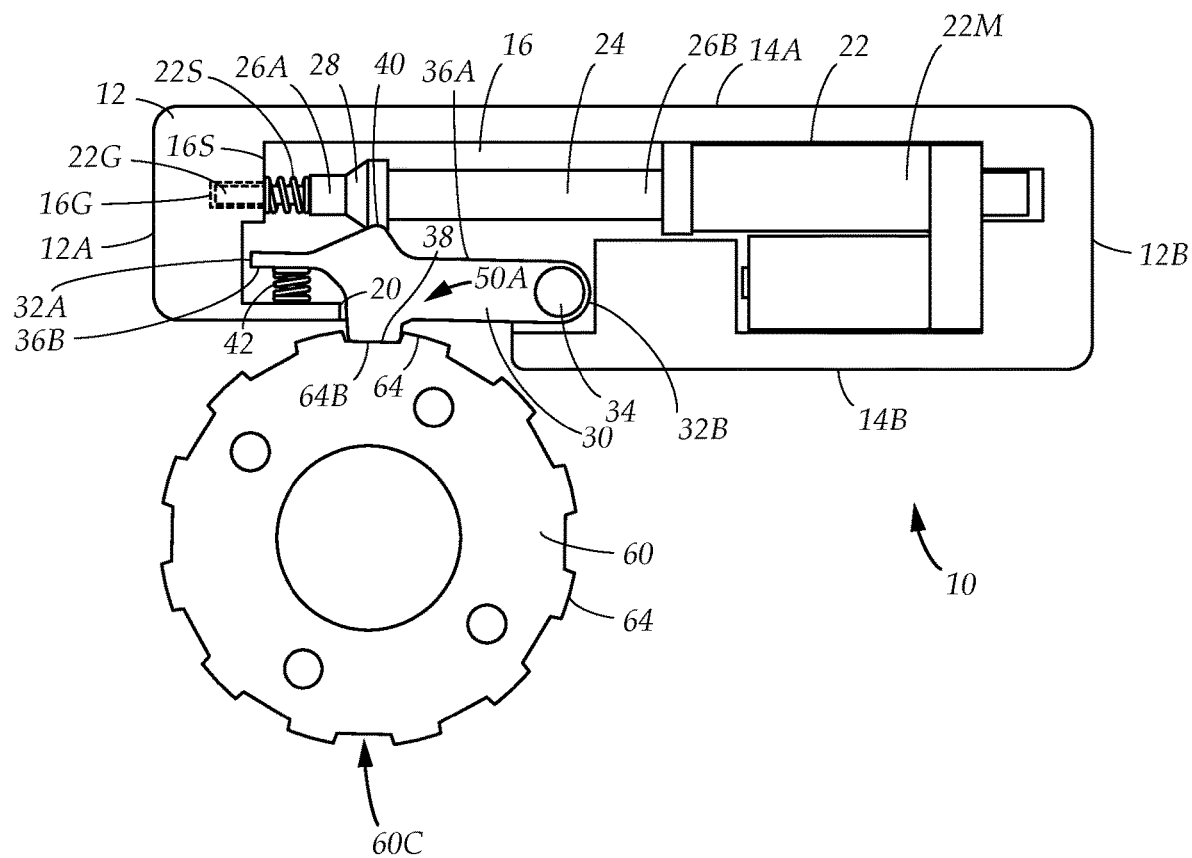
FIG. 1 is an elevational cross section view of an external parking lock with a parking gear and an actuator housing containing a locking lever and an actuator which extends and pushes the locking lever to engage with the parking gear, thereby preventing the gear from rotating, in accordance with an embodiment in the present disclosure.
Figure 2:
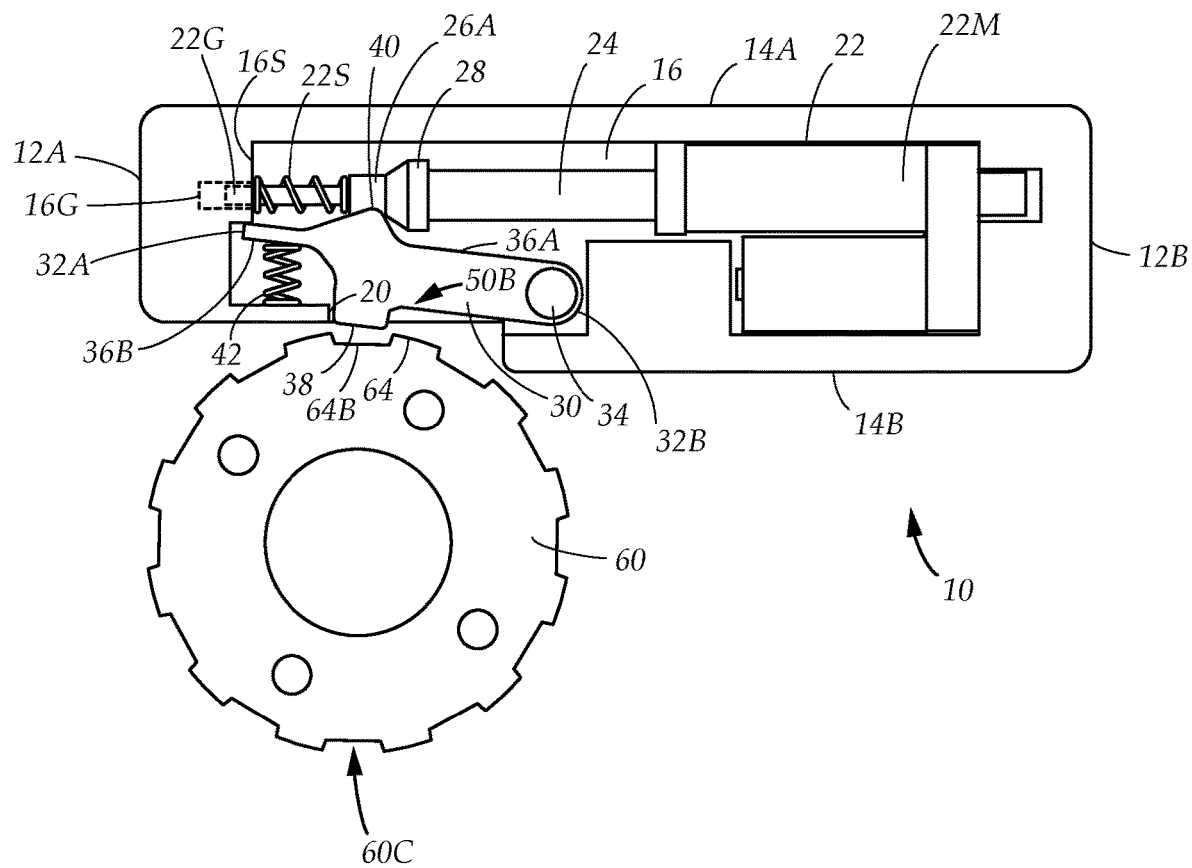
FIG. 2 is an elevational cross section view of the external parking lock, showing the actuator in a retracted position which allows a return spring to disengage the locking lever from the parking gear, thus allowing the gear to rotate, in accordance with an embodiment in the present disclosure.
Figure 3:
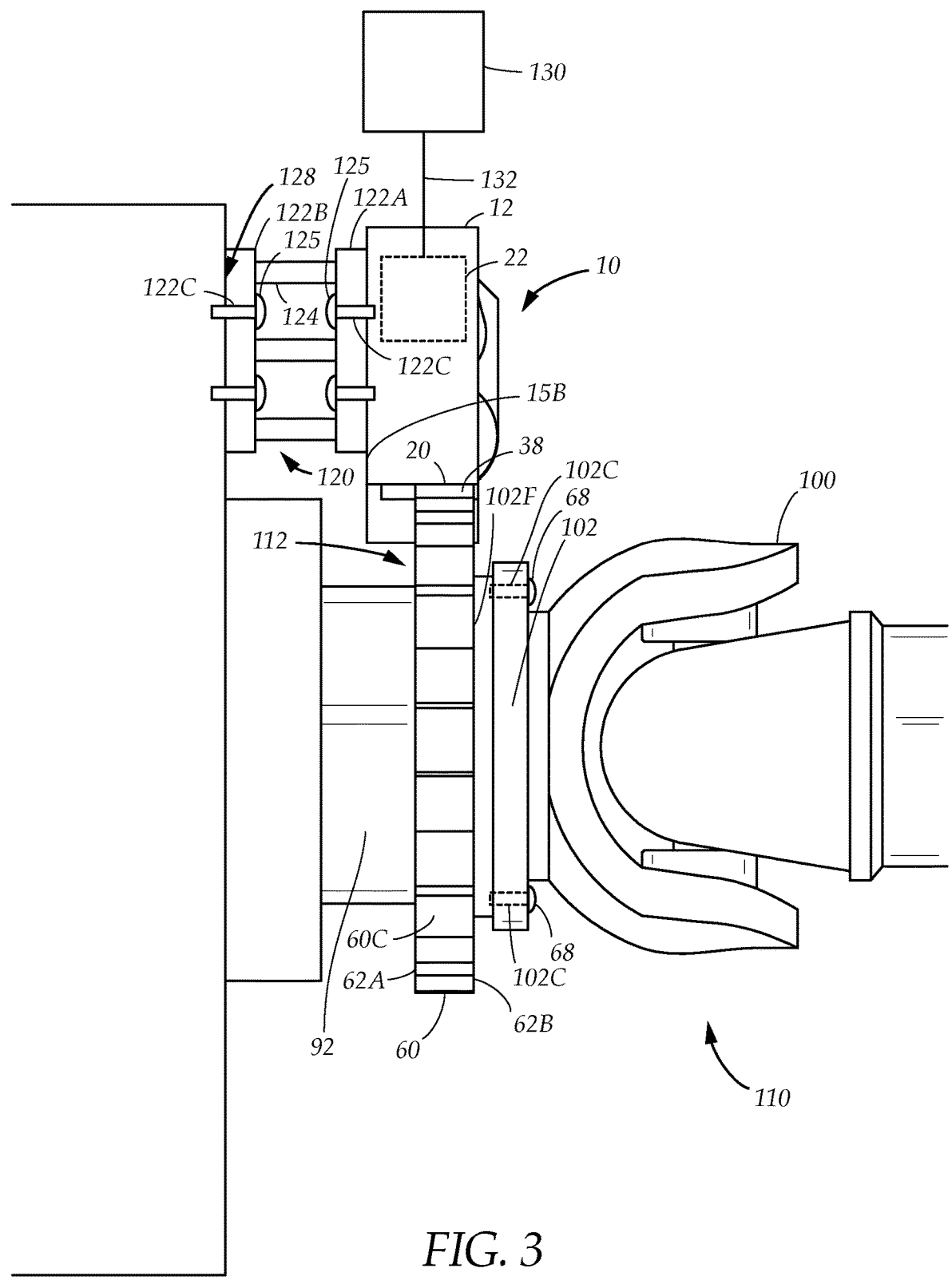
FIG. 3 is an elevational view of the external parking lock integrated with an electric vehicle drive system having a drive motor which rotates a drive shaft, showing the parking gear installed between the drive motor and the drive shaft, allowing the parking gear to prevent the drive shaft from being rotated, in accordance with an embodiment in the present disclosure.

FIGS. 1-3 illustrate an external parking lock assembly 10 comprising a parking gear 60 and an actuator housing 12. The actuator housing 12 contains a locking lever 30 and an actuator 22. The actuator 22 is adapted to pivotally displace the locking lever 30 and cause the locking lever 30 to shift from a disengaged position 50B into an engaged position 50A in which the locking lever 30 contacts the parking gear 60 and prevents the parking gear 60 from rotating.

Figure 6:
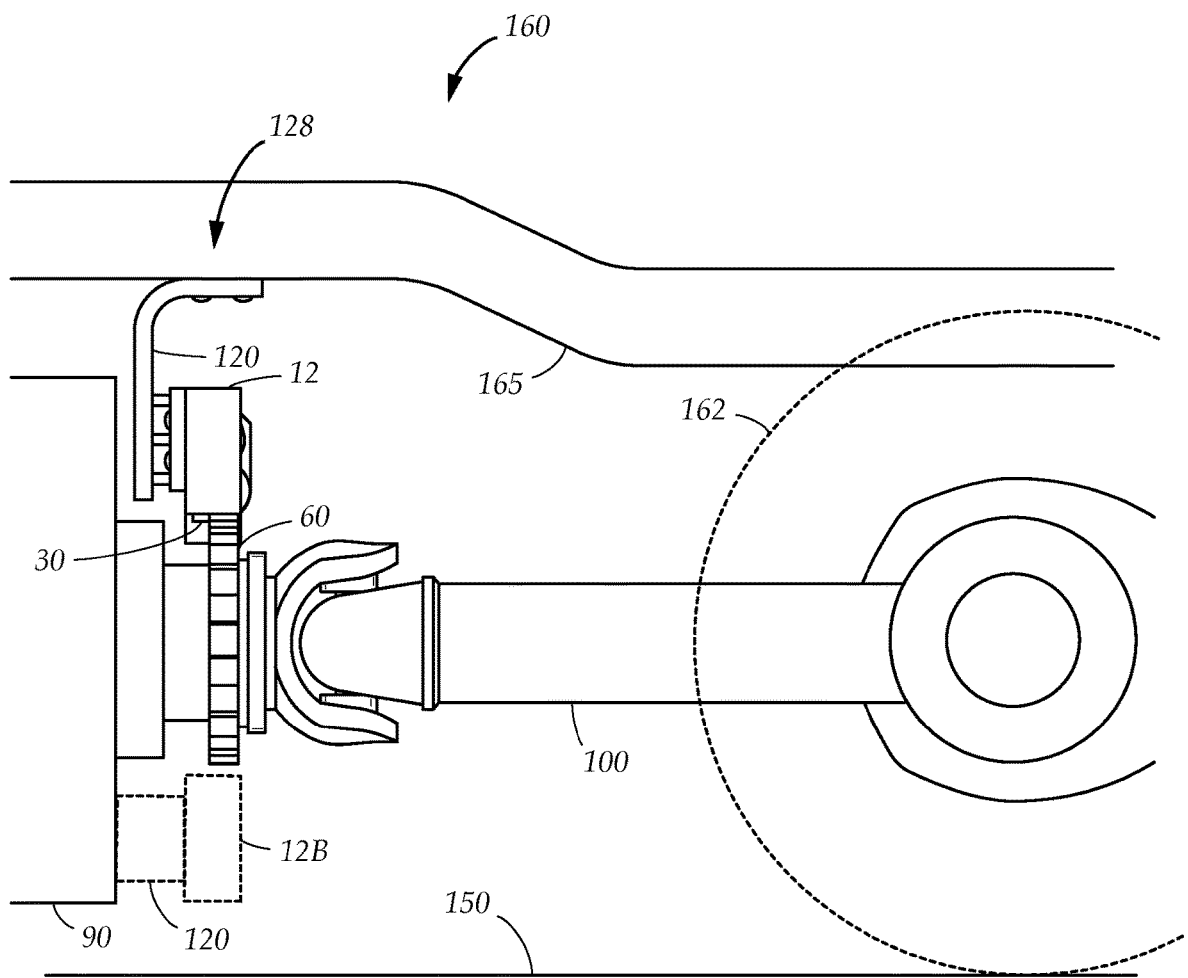
FIG. 6 is an elevational view showing the electric vehicle positioned upon a travel surface, showing two alternate mounting positions for the actuator housing, in accordance with an embodiment in the present disclosure.

Referring to FIG. 3 and FIG. 6 along with FIG. 1, the external parking lock assembly 10 is adapted to integrate with an electric drive system 110 configured within an electrically powered wheeled vehicle 160, such as a car, truck, or bus. The electric drive system 110 comprises a drive motor 90, a drive motor shaft 92, and a drive shaft 100 linked to the drive motor shaft 92. To propel the vehicle 160, the drive motor 90 applies rotational force to the drive shaft 100 via the drive motor shaft 92, which in turn rotates one or more wheels 162, typically through a differential. The wheels 162 rest upon a travel surface 150, such as a road surface or ground surface. The external parking lot assembly 10 prevents the vehicle 160 from moving by preventing the drive shaft 100 from rotating when the locking lever 30 is placed in the engaged position 50A. The parking gear 60 is positioned between the drive motor 90 and the drive shaft 100 and is fastened to form a linkage 112 therebetween, allowing the parking gear to rotate in unison with the drive shaft 100. The actuator housing 12 is positioned to allow the locking lever 30 to selectively engage the parking gear 60 and prevent its rotation, further preventing the vehicle 160 from moving by arresting the rotation of the drive shaft 100.

Figure 4:
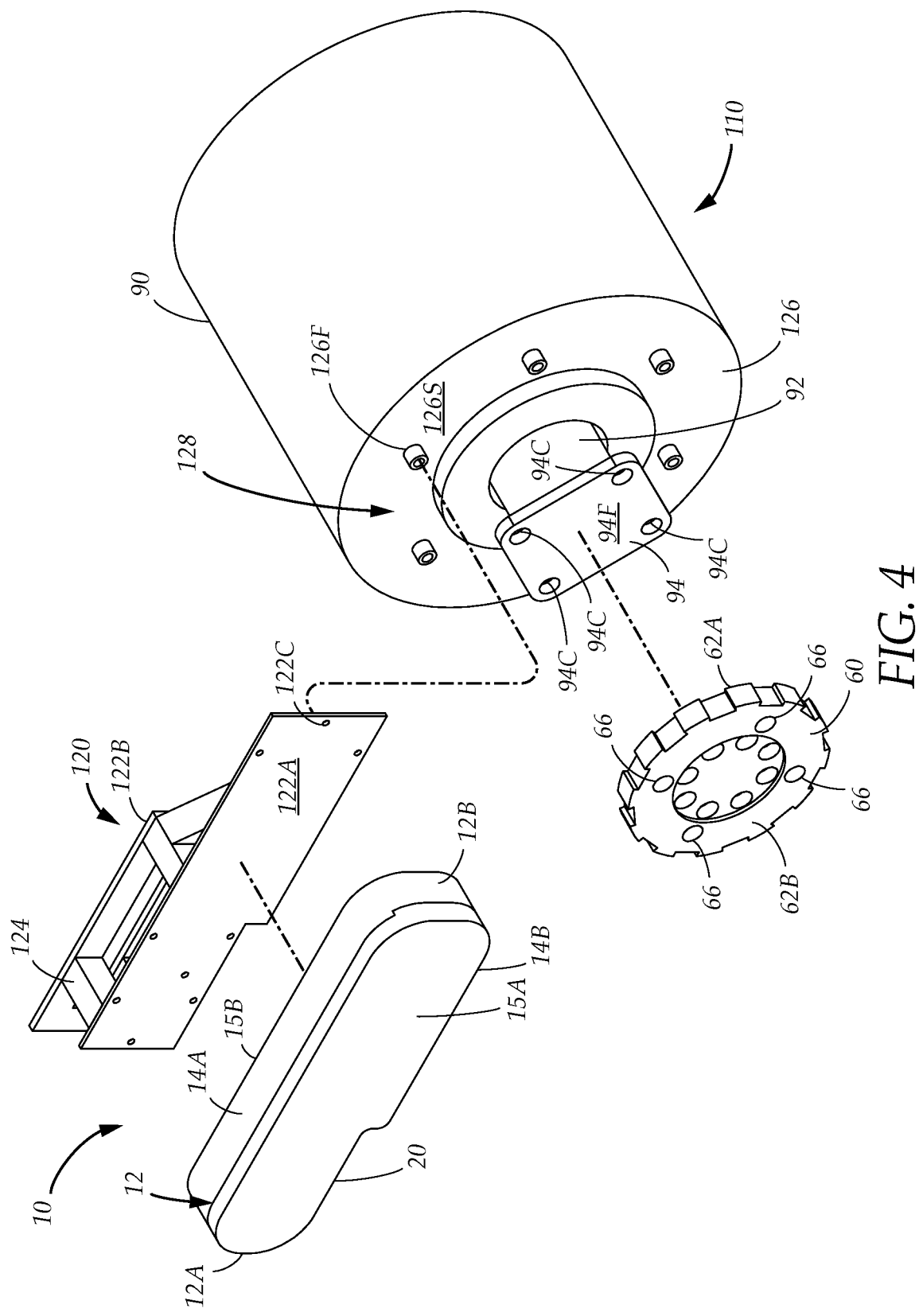
FIG. 4 is an exploded view of the external parking lock along with a mounting bracket which holds the actuator housing in position, in accordance with an embodiment in the present disclosure.
Figure 5:
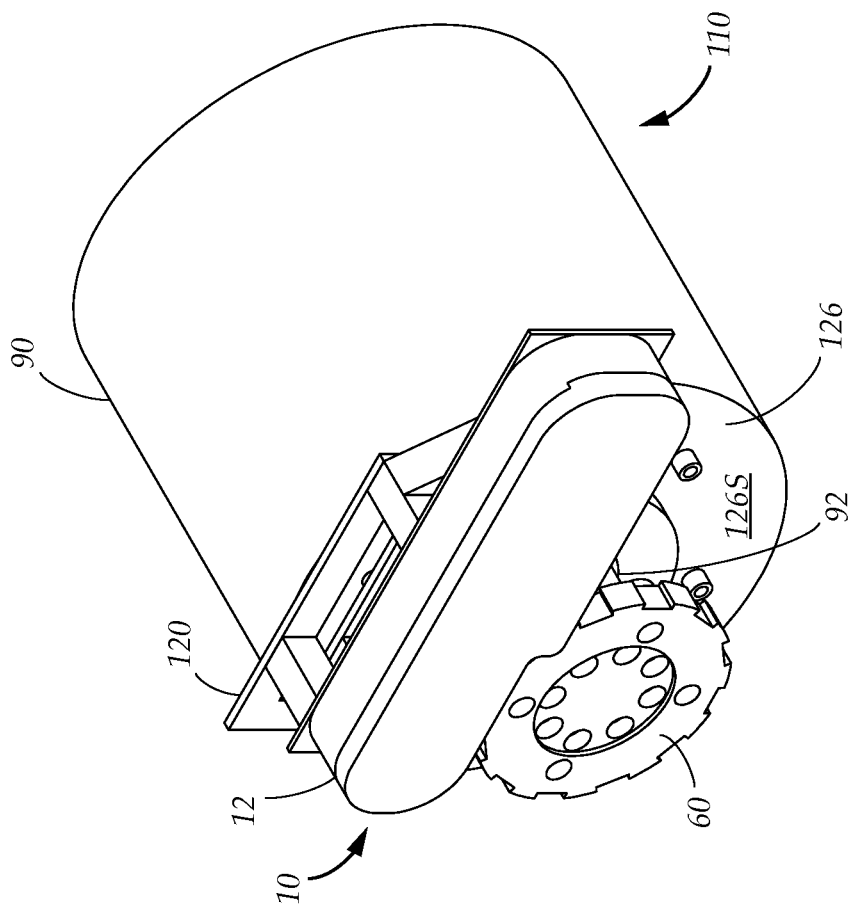
FIG. 5 is a diagrammatical perspective view of the external parking lock, depicting the parking gear attached to the drive motor and further showing the actuator housing secured to the mounting bracket while in position to engage the parking gear, in accordance with an embodiment in the present disclosure.

Referring to FIG. 4 while also referring to FIG. 1 and FIG. 3, in one embodiment, the drive motor shaft 92 projects away from the drive motor 90, and has a drive motor shaft outer end 94. The drive motor shaft outer end 94 terminates in an outer end face 94F with a transverse orientation relative to the drive motor shaft 90. The outer end face 94F may form a flanged surface, with a plurality of drive motor shaft fastening channels 94C which pass through the outer end face 94F.

The drive shaft 100 is colinear with the drive motor shaft 90, and has a drive shaft first end 102 which is oriented towards the outer end face 94F of the drive motor shaft 92. The drive shaft first end 102 terminates in a first end face 102F positioned transversely relative to the drive shaft 100. The first end face 102F may be a flange yoke or other similar apparatus, and has a plurality of drive shaft fastening channels 102C which pass through the first end face 102F. In an unmodified electric drive system 110, the first end face 102F of the drive shaft 100 and the outer end face 94F of the drive motor shaft 90 are fastened together to allow the drive motor 90 to rotate the drive shaft 100.

Continuing to refer to FIG. 4, FIG. 1, and FIG. 3, the parking gear 60 is shaped like a circular disc having a parking gear first face 62A, a parking gear second face 62B in opposing disposition thereto, and an outer edge 60C which extends circumferentially therebetween. The parking gear 60 further has a plurality of teeth 64 which radiate from the outer edge 60C at regular intervals, and a plurality of gear cavities 64B formed between the teeth 64. To allow the parking gear 60 to be fastened to the outer end face 94F of the drive motor shaft 92 and the first end face 102F of the drive shaft 100, the parking gear 60 further has a plurality of parking gear fastening channels 66 which extend between the parking gear first and second faces.

The parking gear 60 has a thickness as measured between the parking gear first and second faces 62A, 62B which is minimized to prevent the placement of the parking gear 60 between the drive motor shaft 92 and the drive shaft 100 from significantly impacting the driving characteristics of the electric vehicle. To install the parking gear 60, the outer end face 94F of the drive motor shaft 92 and the first end face 102F of the drive shaft 100 are separated by a distance which is substantially equal to the thickness of the parking gear 60. The parking gear 60 is placed between the outer end face 94F and the first end face 102F, and the parking gear fastening channels 66 are aligned with the drive shaft fastening channels 102C and the fastening channels 94C are aligned, allowing one of a plurality of parking gear interlocking fasteners 68 to pass through each the aligned fastening channels to secure the parking gear 60 to both the drive shaft 100 and the drive motor shaft 92. The parking gear first face 62A and the parking gear second face 62B are substantially identical, but for illustrative purposes, the parking gear first face 62A may be oriented towards the outer end face 94F of the drive motor shaft 92. The parking gear interlocking fasteners 68 may correspond to bolt, or other suitable fastening means.

Continuing to refer to FIG. 1 and FIG. 4 while also referring to FIGS. 2, 3 and FIG. 6, the parking lock assembly 10 further comprises a mounting bracket 120 which attaches to the actuator housing 12 and allows the actuator housing 12 to be secured to a mounting point 128 within the electric vehicle 160. In one embodiment, the drive motor 90 has a housing 126 with a housing surface 126S and one or more housing fastening points 126F disposed along the housing surface 126S. The mounting point 128 may therefore correspond to the housing surface 126S. The mounting bracket 120 has one or more mounting bracket fastening channels 122C which align with one or more of the housing fastening points 126F, allowing the mounting bracket 120 to be affixed to the housing surface 126S using one or more mounting bracket fasteners 125. In other embodiments, the mounting bracket 120 may be configured as necessary for attachment to other parts of the electric vehicle 160, such as a structural component located at the undercarriage 165, which allow the actuator housing 12 to be positioned to engage the parking gear 60.

Once secured to the mounting bracket 120, the actuator housing 12 is optimally positioned to allow the locking lever 30 to contact and engage the parking gear 60. In a preferred embodiment, the actuator housing 12 is transversely positioned relative to the drive shaft 100, in close proximity to the parking gear 60. The locking lever 30 is adapted to pivot within the actuator housing 12 along a plane which is parallel to the parking gear first and second faces 62A, 62B and which passes through the outer edge 60C of the parking gear 60.

In one embodiment, the actuator housing 12 has a housing first end 12A, a housing second end 12B, a housing first side 14A, and a housing second side 14B. The actuator housing 12 further has a housing first face 15A and a housing second face 15B which extend between the housing first and second ends 12A, 12B and are perpendicular to the housing first and second sides 14A, 14B. In a preferred embodiment, the actuator housing 12 is elongated in shape, and has a length and height whereby the length is substantially greater than height. The housing first side 14A and the housing second side 14B are substantially longer than the height, as defined by the distance separating the housing first and second sides 14A, 14B. In a preferred embodiment, the actuator housing 12 is positioned transverse relative to the drive shaft 100 and may be substantially parallel with the undercarriage 165 of the vehicle 160 or the travel surface 150. The minimal height of the actuator housing 12 provides greater ground clearance between the travel surface 150 and the actuator housing 12. In one embodiment, the actuator housing 12 may be positioned between the drive shaft 100 and the undercarriage 165. In an alternative embodiment, the actuator housing 12 may be placed at an alternative position 12B between the drive shaft 100 and the travel surface 150.

Referring to FIG. 1, FIG. 2, FIG. 3, and FIG. 4, the actuator housing 12 is partially hollow, and has an interior space 16 which encloses the actuator 22 and the locking lever 30. The actuator housing 12 further has a lever opening 20 in communication with the interior space 16 which allows a portion of the locking lever 30 to protrude outwardly from within the interior space 16. In a preferred embodiment, the lever opening 20 is located on the housing second side 14B. The actuator housing 12 is attached to the mounting bracket 120 via either the housing first face 15A or the housing second face 15B. The housing second side 14B is oriented towards the parking gear 60, and the lever opening 20 is placed in close proximity to the outer edge 60C of the parking gear 60.

The locking lever 30 has a locking lever first end 32A, a locking lever second end 32B, and a lever inner side 36A and lever outer side 36B extending therebetween. The locking lever 30 further has a locking projection 38 which projects away from the lever outer side 36B, and an actuation protrusion 40 which projects away from the lever inner side 36A. In a preferred embodiment, the locking lever 30 further has a pivot point 34 positioned proximate to the lever second end 32B, while the locking projection 38 is positioned proximate to the lever first end 32A.

The locking lever 30 is movably secured within the interior space 16 of the actuator housing 12, with the lever first end 32A oriented towards the housing first end 12A and the lever outer side 36B oriented toward the housing second side 14B. The actuation protrusion 40 extends towards the housing first side 14A. The locking lever 30 pivots within the interior space 16 around the pivot point 34, allowing the lever first end 32A to pivot towards either the housing first side 14A or the housing second side 14B. The locking projection 38 is aligned with the lever opening 20, such that the locking projection 38 is able to pass through the lever opening 20 and contact the parking gear 60 when the lever first end 32A is pivoted towards the housing second side 14B.

In a preferred embodiment, the actuator 22 is configured as an electromechanical linear actuator with a motor 22M and an actuator extension rod 24. The actuator 22 may also be configured as an electro-hydraulic linear actuator. The actuator extension rod 24 has an extension rod first end 26A which projects away from the motor 22M, and a distally oriented extension rod second end 26B. The actuator 22 is arranged within the actuator housing 12 adjacent to the housing first side 14A. The motor 22M is positioned at the housing second end 12B, and the extension rod first end 26A is oriented towards the housing first end 12A. Power for the motor 22M is provided through a power circuit 132 connected to a power source 130 located within the electric vehicle, and the actuator 22 may be activated or deactivated through a dedicated control switch, or through integration with the control circuitry of the electric vehicle.

When the motor 22M is energized, it activates and exerts an extending force upon the actuator extension rod 24. When extended, the extension rod first end 26A approaches the housing first end 12A to displace the locking lever 30 and causes it to enter the engaged position 50A. The actuator extension rod 24 contacts the locking lever 30 at actuation projection 40 disposed on the lever inner side 36A, and pushes the lever first end 32A towards the housing second side 14B, further causing the locking projection 38 to project through the lever opening 20. In one embodiment, when the locking lever 30 is in the engaged position 50A, the locking lever 30 is substantially parallel with the actuation extension rod 24.

Referring to FIGS. 1-2, FIG. 3, and FIG. 6, the actuator 22 is configured to extend and retract along a linear path which is transversely oriented relative to the drive shaft 100, and is substantially parallel to the travel surface 150. The actuation protrusion 40 extends away from the lever inner side 36A and intersects the linear path. The actuation protrusion 40 allows the extending force exerted along the linear path to be translated into a pivoting force which is perpendicular to the extending force. In one embodiment, the actuator extension rod 24 further has a flared projection 28 positioned in close proximity to the extension rod first end 26A which has a diameter greater than the diameter of the actuator extension rod 24. The flared projection 28 directly abuts the actuation protrusion 40 as the actuation extension rod 24 extends and pivotally displaces the locking lever 30.

When the motor 22M deactivates, the actuator extension rod 24 retracts, and the extension rod first end 26A withdraws towards the motor 22M. The retraction off the actuator extension rod 24 allows the locking lever 30 to pivot from the engaged position 50A back to the disengaged position 50B, and further allows the drive shaft 100 to rotate freely.

In one embodiment, the actuator 22 further comprises a retraction spring 22S positioned at the extension rod first end 26A. The retraction of the actuator extension rod 24 is assisted by the retraction spring 22S configured as a coiled compression spring, which exerts a retraction force against the actuator extension rod 24 in the direction of the motor 22M. The exerting force of the motor 22M is sufficient to overcome the retracting force. However, once the motor 22M ceases to exert the extending force, the retracting force exerted by the actuator retraction spring 22S pushes the extension rod first end 26A back towards the motor 22M.

In one embodiment, the actuator extension rod 24 has a colinearly positioned extension guide rod 22G which projects from the extension rod first end 26A. The actuator housing 12 further has a guide channel 16G which is formed on the interior surface 16S near the housing first end 12A and is aligned with the extension guide rod 22G. The guide channel 16G receives the extension guide rod 22G and allows it to move freely therein in conformity with the extension or retraction of the actuator extension rod 24. The extension guide rod 22G passes centrally through the actuator retraction spring 22S, and the actuator retraction spring 22S is held in position between the interior surface 16S and the flared projection 28.

Note that in certain alternate embodiments not illustrated, the actuator retraction spring 22S may instead be configured to expand when actuator extension rod 24 extends, and the retracting force is exerted by the contraction of the spring. The actuator 20 may alternatively be configured as a two-way linear actuator, thus allowing the motor 22M to mechanically retract the actuator extension rod 24, thus allowing the parking lock assembly 10 to function without the use of the actuator retraction spring 22S.

Referring to FIG. 1, FIG. 2, and FIG. 3, when the locking lever 30 is interlocked with the parking gear 60 in the engaged position 50A, the locking projection 38 is in physical contact with the parking gear 60 with at least one of the teeth 64. In a preferred embodiment, the locking projection 38 conforms closely in shape to the gear cavity 64B formed between each pair of teeth 64. To overcome any frictional forces which may inhibit the disengagement of the locking lever 30 from the parking gear 60, the actuator housing 12 further contains a return spring 42 configured to exert a return force which pushes the lever first end 32A away from the lever opening 20. In one embodiment, the return spring 42 contacts the lever outer side 36B proximate to the lever first end 32A, and the return force is exerted away from the lever opening 20 and toward the housing first side 14A.

The actuator motor 22M extends the actuator extension rod 24 with sufficient extending force to overcome the return force exerted by the return spring 42 as well as the retracting force exerted by the actuator retraction spring 22S, thus allowing the actuator 22 to push the locking lever 30 into the engaged position 50A. The retraction of the actuator extension rod 24 removes the extending force and allows the return force to act upon the locking lever 30 to forcibly disengage the locking projection 38 from the parking gear 60.

Referring to FIG. 1, FIG. 3, FIG. 4 and FIG. 6, in one embodiment, the mounting bracket has an actuator mounting face 122A to which the actuator housing 12 is secured, and a mounting point face 122B via which the mounting bracket 120 is secured to the mounting point 128. The bracket fastening channels 122C may be configured on the mounting point face 122B and/or the actuator mounting face 122A. In one embodiment, the mounting point face 122B and the actuator mounting face 122A are joined by one or more mounting bracket spacers 124, and are oriented substantially in parallel. In alternate embodiments where the mounting point 128 is positioned upon a structural component of the electric vehicle, chassis, or undercarriage 165, the actuator mounting face 122A is positioned at an angle relative to the mounting point 128 which optimally aligns the lever opening 20 of the actuator housing 12 with the parking gear 60 and allows the locking projection 38 of the locking lever 30 to engage the teeth 64 and gear cavities 64B. For example, if the mounting point 128 is located on the undercarriage 165 of the electric vehicle 160, the actuator mounting face 122A may be oriented approximately ninety-degrees in relation to the mounting point face 122B to ensure that the actuator housing 12 is positioned transverse to the drive shaft 100 and that the locking lever 30 is coplanar with the outer edge 60C of the parking gear 60.

In a preferred embodiment, the locking lever 30 and the parking gear 60 are formed of a metal or other material which has sufficient strength to arrest the electric drive system. Furthermore, the material forming the locking lever 30 and the parking gear 60 is sufficiently durable to resist being damaged by the repeated engagement and disengagement between the locking lever 30 and the parking gear 60.

It is understood that when an element is referred herein-above as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a parking lock assembly. The disclosure is illustrated by example in the drawing figures, and throughout the written description. It should be understood that numerous variations are possible, while adhering to the inventive concept. Such variations are contemplated as being a part of the present disclosure.

What is claimed is:

1. A parking lock assembly for a vehicle with an electric drive system, the electric drive system comprising a drive motor with a drive motor shaft, a drive shaft, and one or more wheels, the drive motor applies rotational force to the drive shaft via the drive motor shaft to rotate the one or more wheels, the parking lock assembly comprising:

a parking gear positioned between the drive motor shaft and the drive shaft, the parking gear having a parking gear first face attached to the drive motor shaft, a parking gear second face attached to the drive shaft, and an outer edge extending circumferentially between the parking gear first face and the parking gear second face, the parking gear forms a linkage which allows the drive motor to rotate the drive shaft, the parking gear further having a plurality of teeth which radiate from the outer edge and gear cavities formed between the teeth; and an actuator housing positioned transversely in relation to the drive shaft and in close proximity to the linkage, the actuator housing containing an actuator and a locking lever, the actuator exerts an extending force which displaces the locking lever from a disengaged position to an engaged position, the locking lever projects from the actuator housing when placed in the engaged position to contact the parking gear and interlock with one of the gear cavities, the locking lever prevents the drive shaft and the wheels from rotating by arresting the rotation of the parking gear.

2. The parking lock assembly as described in claim 1, wherein the actuator housing further contains a return spring configured to exert a return force against the locking lever, the return spring returns the locking lever to the disengaged position when the actuator relaxes the extending force, breaking the contact between the locking lever and the parking gear, thus allowing the parking gear and the drive shaft to rotate.

3. The parking lock assembly as described in claim 2, wherein the locking lever has a lever first end, a lever second end, and a lever pivot point disposed at the lever second end allowing the locking lever to pivot along a plane which passes between and is parallel with the parking gear first face and the parking gear second face.

4. The parking lock assembly as described in claim 3, wherein the actuator housing has a housing first side which faces away from the parking gear, a housing second side which faces towards the parking gear, an interior space which encloses the actuator and the locking lever, and a lever opening disposed on the housing second side in communication with the interior space which allows the locking lever to project therethrough to contact the parking gear when placed in the engaged position.

5. The parking lock assembly as described in claim 4, wherein:
the locking lever is positioned within the interior space adjacent to the housing second side, the locking lever has a lever outer side which faces the lever opening, a lever inner side which faces away from the lever opening, and an actuation protrusion extending perpendicularly away from the lever inner side;
the actuator is positioned within the interior space adjacent to the housing first side, the actuator has a motor and an actuator extension rod, the actuator extension rod extends and retracts along a linear path which is transverse to the drive shaft, the actuator extension rod contacts the actuation protrusion when extended, causing the locking lever to pivot away from the actuator extension rod and enter the engaged position; and
the return spring is positioned to direct the return force against the lever outer side and pivot the locking lever from the engaged position to the disengaged position.

6. The parking lock assembly as described in claim 5, wherein:

the locking lever further has a locking projection which extends from the lever outer side to pass through the lever opening and interlock with one of the gear cavities of the parking gear when the locking lever is in in the engaged position.

7. The parking lock assembly as described in claim 6, wherein:
the drive motor further comprises a housing having a housing surface;
the parking lock assembly further has a mounting bracket externally secured to a mounting point corresponding to the housing surface; and
the actuator housing is secured to the mounting bracket.

8. An electric drive system with a parking lock assembly for a vehicle with a drive shaft and a plurality of wheels, comprising:
a drive motor having a housing and a drive motor shaft, the drive motor is adapted to generate rotational force to rotate the drive shaft and turn the plurality of wheels, the housing has a housing surface which is perpendicular in relation to the drive motor shaft;
a mounting bracket externally fastened to the housing surface;
a parking gear positioned between the drive motor shaft and the drive shaft, the parking gear having a parking gear first face attached to the drive motor shaft, a parking gear second face attached to the drive shaft, and an outer edge extending circumferentially between the parking gear first face and the parking gear second face, the parking gear forms a linkage which allows the drive motor to rotate the drive shaft, the parking gear further having a plurality of teeth which radiate from the outer edge and gear cavities formed between the teeth; and
an actuator housing fastened to the mounting bracket, the actuator housing containing an actuator and a locking lever, the locking lever pivots about a plane which is parallel with and which passes between the parking gear first face and the parking gear second face, the actuator is adapted to activate and pivot the locking lever from a disengaged position to an engaged position, the locking lever projects from the actuator housing when placed in the engaged position to contact the parking gear and interlock with one of the gear cavities, the locking lever prevents the drive shaft and the wheels from rotating by arresting the rotation of the parking gear.

9. The electric drive system as described in claim 8, wherein the actuator housing further contains a return spring configured to exert a return force against the locking lever, the return spring returns the locking lever from the engaged position to the disengaged position when the actuator deactivates, breaking the contact between the locking lever and the parking gear, thus allowing the parking gear and the drive shaft to rotate.

10. The electric drive system as described in claim 9, wherein the actuator housing has a housing first end, a housing second end, and a housing first side and housing second side extending therebetween, the actuator housing has an elongated shape extending between the housing first and second ends, and the mounting bracket holds the actuator housing transversely in relation to the drive shaft and in close proximity with the linkage, the housing second side faces towards the parking gear and has a lever opening which allows the locking lever to protrude therethrough to contact the parking gear.

11. The electric drive system as described in claim 10, wherein:

the actuator has an actuator extension rod which extends and retracts along a linear path between the housing first end and the housing second end, the locking lever has a lever inner side which faces the housing first side and a lever outer side which faces the lever opening on the housing second side, the locking lever further has an actuation protrusion which projects from the lever inner side and intersects the linear path of the actuator extension rod, the actuator extension rod contacts the actuation protrusion as it extends along the linear path and displaces the locking lever toward the lever opening into the engaged position.

12. The electric drive system as described in claim 11, wherein:

the locking lever further has a locking projection disposed on the lever outer side, and the locking lever is substantially parallel with the actuator extension rod when placed in the engaged position.

13. A method for preventing undesired movement of a vehicle with an electric drive system, the electric drive system comprising a drive motor with a drive motor shaft and a housing, and a drive shaft which rotates a plurality of wheels, the drive motor generates rotational force which turns the wheels via the drive shaft, the vehicle having an undercarriage, the method comprising the steps of:

providing a parking gear fastened to the drive motor shaft and the drive shaft which forms a linkage therebetween which allows the drive motor to rotate the drive shaft;

providing an actuator housing containing an actuator and a locking lever;

providing a mounting bracket;

securing the mounting bracket to a mounting point located on the undercarriage of the vehicle or the housing of the drive motor, and securing the actuator housing to the mounting bracket;

activating the actuator, displacing the locking lever into an engaged position, contacting the parking gear with the locking lever, and preventing the parking gear from rotating; and locking the drive shaft via the linkage formed by the parking gear, and preventing the wheels from turning.

14. The method as recited in claim 13, wherein:

the actuator housing further contains return spring;

the step of locking the drive shaft is followed by the step of deactivating the actuator, displacing the locking lever from the engaged position to a disengaged position and breaking contact between the locking lever and the parking gear, and allowing the drive shaft to rotate.

15. The method as recited in claim 14, wherein:

the parking gear has a parking gear first face attached to the drive motor shaft, a parking gear second face attached to the drive shaft, and a circumferential outer edge extending between the parking gear first face and the parking gear second face;

the locking lever has a first end, a lever second end, and a pivot point located at the lever second end; and the step of activating the actuator further comprises pivoting the locking lever along a plane which is transverse to the drive shaft and which passes between the parking gear first face and the parking gear second face.

16. The method as recited in claim 15, wherein:

the actuator has an actuation extension rod which extends and retracts along a linear path which is transverse to the drive shaft, and the locking lever has an actuation protrusion positioned facing the actuator extension rod and which intersects the linear path; and the step of activating the actuator further comprises extending the actuation extension rod along the linear path, and contacting the actuation protrusion of the locking lever.

* * * * *